Oct. 29, 1968

J. C. HURLBURT 3,407,578

CUTTER BAR LATCH

Filed Dec. 20, 1965

INVENTOR.
JOSEPH C. HURLBURT
BY *Walter V. Wright*

AGENT

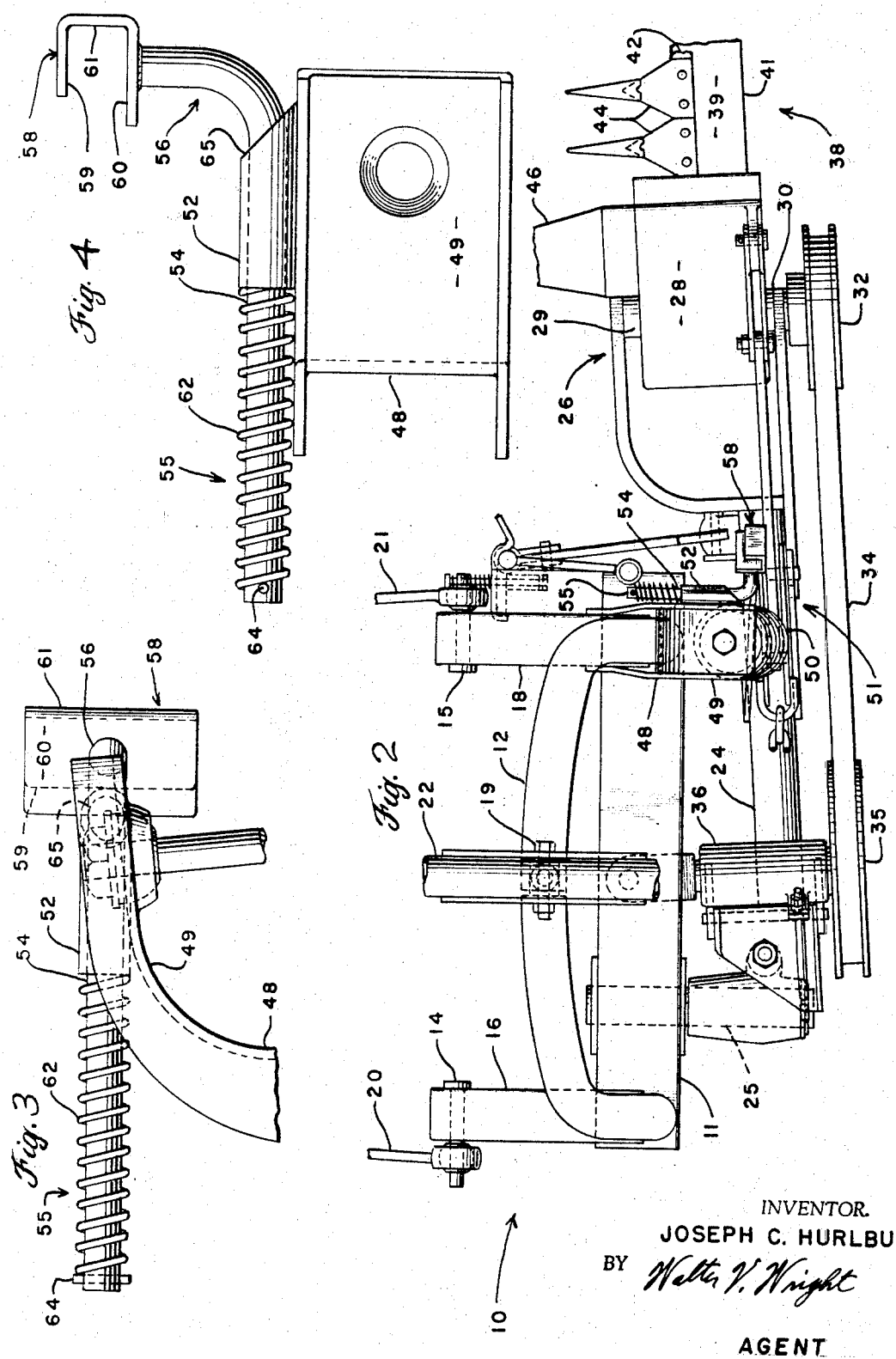

United States Patent Office 3,407,578
Patented Oct. 29, 1968

3,407,578
CUTTER BAR LATCH
Joseph C. Hurlburt, Leola, Pa., assignor to Sperry Rand Corporation, New Holland, Pa., a corporation of Delaware
Filed Dec. 20, 1965, Ser. No. 514,869
1 Claim. (Cl. 56—25)

ABSTRACT OF THE DISCLOSURE

A latch for a cutter bar comprised of a generally C-shaped latch member, yieldably mounted on a mower base frame and operatively engageable with the cutter bar, adapted to confine the mower cutter bar against vertical swinging movement when the cutter bar is in a transport position.

---

This invention relates to mowers of the cutter bar type. More specifically, it relates to improved means for positively latching a mower cutter bar in a transport position.

Mower cutter bars are are generally mounted for vertical swinging movement between two extreme positions; an operative, or mowing position, wherein the cutter bar extends full length laterally from its base frame, and a transport position wherein the cutter bar is folded back over the frame to reduce the overall width of the implement to dimensions suitable for transport over the highways, through narrow gates, and so forth. The cutter bar assembly is fairly heavy, resilient and, because of the sharp knife members and pointed knife guards, extremely dangerous.

It is recognized in the art that it is desirable, if not essential, to lock the cutter bar in transport position. If it is not locked in transport position, the cutter bar may be bounced back to operative position during transport. This can be very hazardous in addition to subjecting mower components to extreme stresses. Early solutions to this problem were in the form of latch mechanism located at or near the pivotal mounting point of the cutter bar to hold the cutter bar in a generally vertical transport position. With the length and weight of present day cutter bar assemblies, this solution is no longer practical. The current popular practice is to pivotally mount a brace rod on the mower base frame. The brace rod has a threaded end which can be passed through a hole in the cutter bar and receive a nut or other threaded fastener to fasten the cutter bar in transport position. This solution involves the problems of the cost of the brace rod and the forming of holes in the cutter bar, what to do with the long brace rod when the mower is operating, keeping track of the threaded fastener, and the need for simultaneous manipulation of the brace rod, the dangerous cutter bar, and the threaded fastener when it is desired to fix the cutter bar in transport position. The complicacy of operation of many conventional cutter bar latching mechanisms is such that it discourages, rather than encourages, their use.

It is an object of this invention to provide novel mechanism for latching and supporting a mower cutter bar in transport position.

It is another object of this invention to provide mower cutter bar support and latching mechanism which is low in cost and has no removable, or loose, parts.

It is another object of this invention to provide mower cutter bar latching mechanism which is quick acting and operable with one hand.

It is another object of this invention to provide mower cutter bar transport latching mechanism which employs a short coupling member between the mower cutter bar and the mower base frame thereby providing a basically sturdy cutter bar support at relatively low cost.

It is another object of this invention to provide mower cutter bar transport latching mechanism which is self-orienting into proper latching position.

It is another object of this invention to provide cutter bar transport latching mechanism which allows the cutter bar sufficient movement, in response to transport vibration and bumps, to avoid stress and deformation of the mechanism's elements while positively preventing the cutter bar from being accidentally dislodged from transport position.

These and other objects and advantages of this invention will be apparent upon reference to the following description and claim taken in conjunction with the accompanying drawings wherein:

FIG. 2 is a plan view of the mower shown in FIG. 1;

FIG. 3 is a fragmentary enlarged side elevational view of the cutter bar latching mechanism shown in FIGS. 1 and 2; and FIG. 4 is a plan view of the mechanism appearing in FIG. 3.

Figure 1:
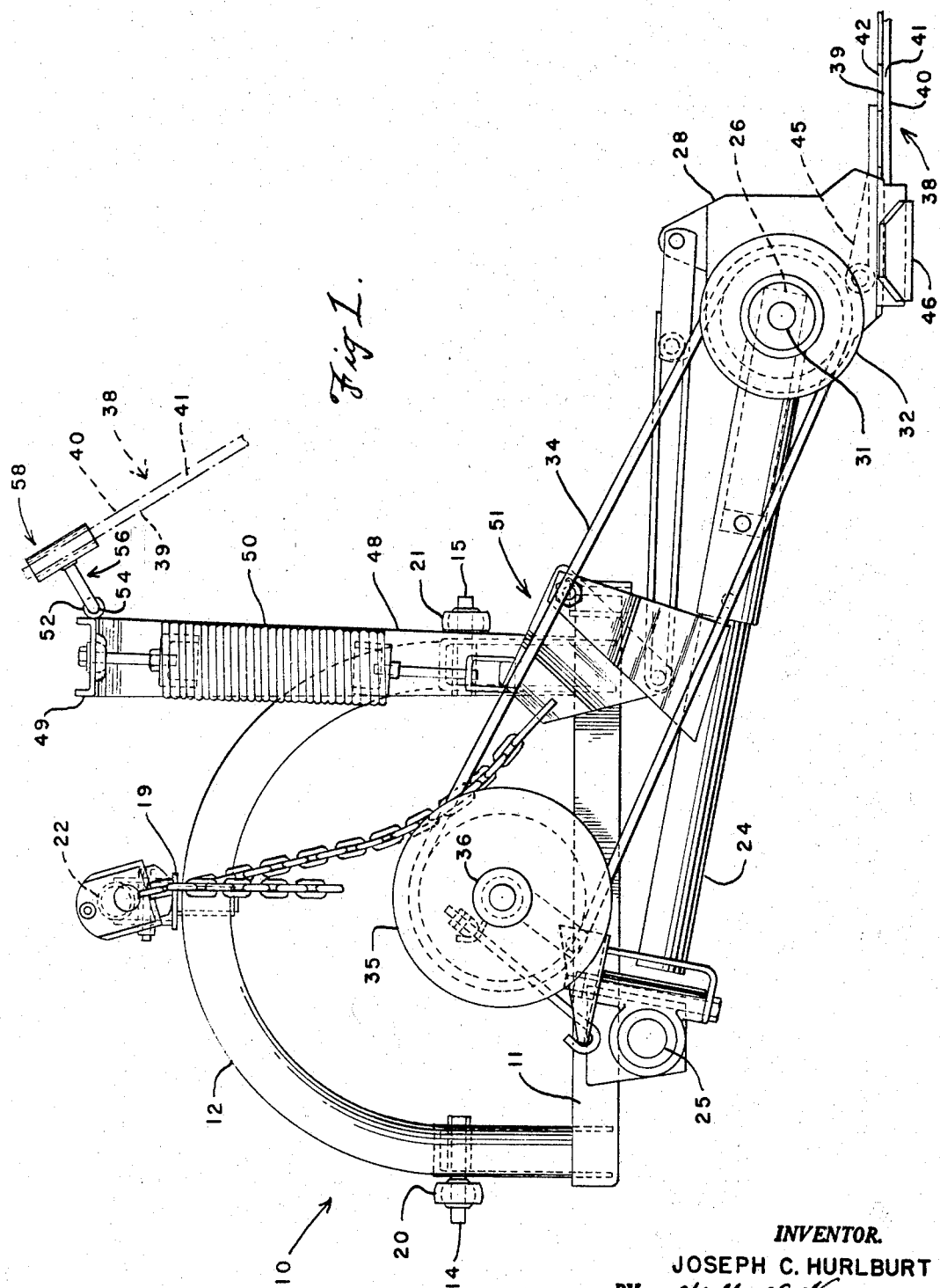
FIG. 1 is a rear elevational view of a mower provided with cutter bar transport latching mechanism constructed in accordance with the principles of the present invention.

Referring to the drawings in detail, particularly FIGS. 1 and 2, the reference numeral 10 indicates, generally, the base frame of a tractor mounted mower. Base frame 10 has a transverse horizontal main beam 11 which carries an upstanding inverted U-shaped mast 12. A pair of hitch members 14 and 15 are carried by arm portions 16 and 18 of the base frame which extend forwardly from main beam 11. A third hitch point is provided by connecting mechanism 19 carried by mast 12 at the top center part of the mast. In this manner the main frame is adapted to be connected to the left and right drawbars 20 and 21 and the upper stabilizer arm 22 of a conventional tractor three point hitch implement mounting system.

The usual mower drag bar 24 is carried by a mounting pintle 25 which is fixed to and extends rearwardly from main frame cross beam 11. The drag bar 24 extends downwardly and laterally from pintle 25 to a bifurcated free end 26. A mower driving head 28 is disposed between the arms of the bifurcated end of the drag bar and is mounted thereon by pivot members 29 and 30 (FIG. 2) for vertical pivotal movement relative to the drag bar about an axis which is coaxial with the axis of the driving head pulley shaft 31 visible in FIG. 1. In accordance with the usual practice, power is supplied to the driving head 28 from the power-take-off mechanism of the tractor via a pulley 32 journalled on the aforementioned shaft 31, a V-belt 34 and a main drive pulley 35 carried by a journal 36 which is mounted on the drag bar. The usual extension shaft (not shown) extends forwardly from pulley 35 and connects directly to the power-take-off shaft of the tractor on which the mower is mounted.

A mower cutter bar 38 is fixedly mounted on the underside of the driving head 28 and normally extends laterally outwardly therefrom in a generally horizontal attitude close to the ground when the mower is in operation. Cutter bar 38 has top and bottom surfaces 39 and 40, respectively, and a relatively narrow rear edge 41. The usual sickle bar 42 with its forwardly projecting knives 44 is mounted on the upper surface 39 of the cutter bar to be reciprocated relative thereto by a driving connection 45 (FIG. 1) to the mower driving head 28.

In FIGS. 1 and 2 it may be seen that a ground shoe 46 is provided on the bottom of the mower driving head 28. In order that the mower cutter bar be able to float along the ground on ground shoe 46, it is necessary to counterbalance a considerable portion of the weight of the drag bar, mower driving head and cutter bar. In order to accomplish this, the base frame 10 includes an upstanding stanchion 48 mounted atop the main frame beam 11 at the right end thereof as seen in FIGS. 1 and 2. The uppermost end 49 of stanchion 48 turns rearwardly as may be seen in FIG. 3 as well as FIGS. 1 and 2. A counterbalancing spring 50 has its upper end anchored in the rearwardly turned end 49 of stanchion 48 and its lower end connected to supporting linkage generally indicated by the reference numeral 51 in FIG. 1. The linkage 51 is fixedly mounted on drag bar 24. In the particular mower shown, the linkage 51 also enters into the usual cutter bar gagging operation; but this does not constitute a part of the present invention and therefore need not be explored in detail.

When it is desired to move the mower between fields or over the highways, the cutter bar 38 is manually pivoted upwardly to the position shown in phantom lines in FIG. 1. In this position, the cutter bar is inclined upwardly, or folded back, so to speak, to a position wherein the outer end of the cutter bar overlies at least the spring stanchion portion of the mower base frame. It will be apparent from FIGS. 1 and 2 that when the cutter bar is in transport position, the rear edge of the cutter bar 41 lies in a vertical plane and the top and bottom surfaces 39 and 40 lie in fore-and-aft extending planes inclined upwardly and inwardly from the free end 26 of the drag bar.

Referring now primarily to FIGS. 3 and 4, a short piece of circular cross section tube 52 is welded, or otherwise fixedly attached, to the upper end 49 of spring stanchion 48. The central axis of tube 52 extends in the fore-and-aft direction relative to the direction of travel of the mower and lies in a generally horizontal plane. Tube 52 constitutes a slideway for an elongated rod 54 which extends through the tube and is freely slidable therein in the fore-and-aft direction. Rod 54 has end portions 55 and 56 (see FIG. 4) which project, respectively, forwardly and rearwardly from the ends of tube 52. The rearwardly projecting end 56 of rod 54 is bent at a right angle to the longitudinal central axis of tube 52, as is best seen in FIGS. 4 and 2. A C-shaped latch member 58 is welded, or otherwise fixed attached to the right angle portion 56 of rod 54. Latch member 58 has first and second leg portions 59 and 60 interconnected by a central bight portion 61. Bight portion 61 serves to space leg portions 59 and 60 apart a distance slightly in excess of the thickness of cutter bar 38. The latch member 58 is mounted on rod 54 with the leg portions 59 and 60 opening forwardly and the bight portion 61 disposed to the rear. It will be apparent in FIGS. 4 and 2 that lower leg portion 60 extends forwardly slightly further than first, or upper, leg portion 59. This arrangement of the leg portions 59 and 60 is preferable although not essential. It enables the cutter bar to be lowered onto the forwardly projecting portion of second leg 60 during the latching operation. A coil spring 62 is carried by the forwardly projecting portion 55 of rod 54. A stop pin 64 extends through rod 54 at the forwardmost end thereof. The spring 62 is compressed between pin 64 and the forwardmost end of tube 52, thereby urging the rod 54 and latch member 58 forwardly relative to the mower frame to a normal position wherein bight portion 61 of latch 58 lies in the vertical plane of the cutter bar rear edge 41.

tube 52 is cut at an angle. As may be seen in phantom lines in FIG. 3, this changes the circular cross sectional form of tube 52 into an elliptical form at the rear end of the tube. This elliptical form acts as a guide means or guide slot for the right angled portion 56 of rod 54. When spring 62 urges rod 54 to the left as seen in FIGS. 3 and 4, the elliptical shape of rear end portion 65 of tube 52 orients the rod relative to the axis of tube 52 to the desired angled position for latching the cutter bar in transport position. This position of the latch member is seen in FIGS. 1 and 2. When the operator raises the cutter bar to the transport position shown in FIG. 1, he merely grasps the right angle portion 56 of rod 54, which makes a convenient handle, and pulls the rod rearwardly a slight amount. The cutter bar may then be lowered onto a forwardly projecting portion of second leg 60 of the latch member 58. When the operator releases rod 54, the latch member is moved forwardly by spring 62 until the bight portion 61 of the latch member engages the rear edge 41 of the cutter bar. The upper and lower leg portions 59 and 60 of the latch member then lie, respectively, above and below the surfaces of the cutter bar. This positively prevents the cutter bar from being bounced or otherwise accidentally swung vertically back to its operative position. The beveled end of tube 52 not only insures proper angular orientation of the latch member 58 for latching purposes, but also holds the latch member in the proper position when the cutter bar is in operative position. The significance of this is that the latch member cannot move around and become damaged or foul the operation of the counterbalancing spring 50.

In addition to the features of simplicity of operation, the absence of loose or free parts, and the basic ruggedness and mechanical simplicity with which this preferred structural embodiment fulfills the aforementioned objects of invention, it should further be noted that the high location of the latch member on the mower base frame adds further to its convenience and ease of operation as well as affording excellent latching leverage relative to the cutter bar. During transport, the drag bar and cutter bar are still partially supported by the counterbalancing spring 50. In passing over bumps or the like, the drag bar tends to bounce about the axis of pintle 25. This action urges the cutter bar to move, primarily longitudinally, relative to latch 58. It will be apparent from FIG. 1 that the latch 58 permits such movement without subjecting any of the structural elements to stress producing resistance. The cutter bar is free to slide longitudinally within latch member 58 and the latch member 58 is free to pivot about the axis of rod 54 except for the self-realigning action of the rod spring 62 and the beveled end 65 of tube 52. The latch 58, however, positively prevents the cutter bar from swinging out of transport position toward operative position.

Having thus described my invention, what I claim is:

1. In a mower having a base frame and an elongated cutter bar carried by said base frame for vertical swinging movement between a generally horizontal outwardly extending operative position close to the ground and an upwardly and inwardly inclined transport position wherein said cutter bar lies adjacent a portion of said base frame, said cutter bar having generally parallel upper and lower sides and a relatively narrow straight rear edge, said rear edge lying in a predetermined generally vertical plane when said cutter bar is in transport position, improved means for locking said cutter bar in said transport position comprising a generally C-shaped latch member having first and second leg portions and an interconnecting bight portion, said bight portion spacing said first and second leg portions apart a distance in excess of the distance between said upper and lower sides of said cutter bar, and means mounting said latch member at the top of said base frame portion for movement forwardly into and rearwardly out of said predetermined vertical plane, said mounting means including a hollow tube of circular cross section disposed forwardly of said predetermined vertical plane and having a longitudinal axis extending perpendicular to said predetermined vertical plane, a rod extending through said tube and having end portions projecting from both ends of the tube, said rod being freely slideable forwardly and rearwardly within said tube, the portion of said rod projecting rearwardly from said tube extending at a right angle to the axis of said tube, means fixedly mounting said C-shaped latch member on said right angle portion of said rod with said leg portions extending forwardly from said bight portion, the rearmost end of said tube being tapered at a predetermined angle into an elliptical form, a stop member carried by the forwardly projecting end portion of said rod, and a coil spring carried by said rod and being compressed between said stop member and the forward end of said tube thereby urging said rod forwardly relative to said tube to move the right angle portion of said rod into engagement with said elliptically formed rear end of said tube, said elliptical end of said tube normally orienting the right angle portion of said rod relative to the axis of said tube to a position wherein said bight portion lies behind and adjacent said cutter bar rear edge and said first and second leg portions of said C-shaped latch member lie in planes parallel to the planes of said top and bottom sides of said cutter bar when the cutter bar is in transport position.

References Cited

UNITED STATES PATENTS

| | | |
|---|---|---|
| 1,448,642 | 3/1923 | Tomlinson. |
| 2,603,511 | 7/1952 | Schatzman _____ 292—114 |
| 2,700,860 | 2/1955 | Barber _____ 56—25 |
| 3,109,272 | 11/1963 | Hedtke _____ 56—25 |
| 3,323,294 | 6/1967 | Knepper _____ 56—25 |

LUCIE H. LAUDENSLAGER, *Primary Examiner.*